UNITED STATES PATENT OFFICE.

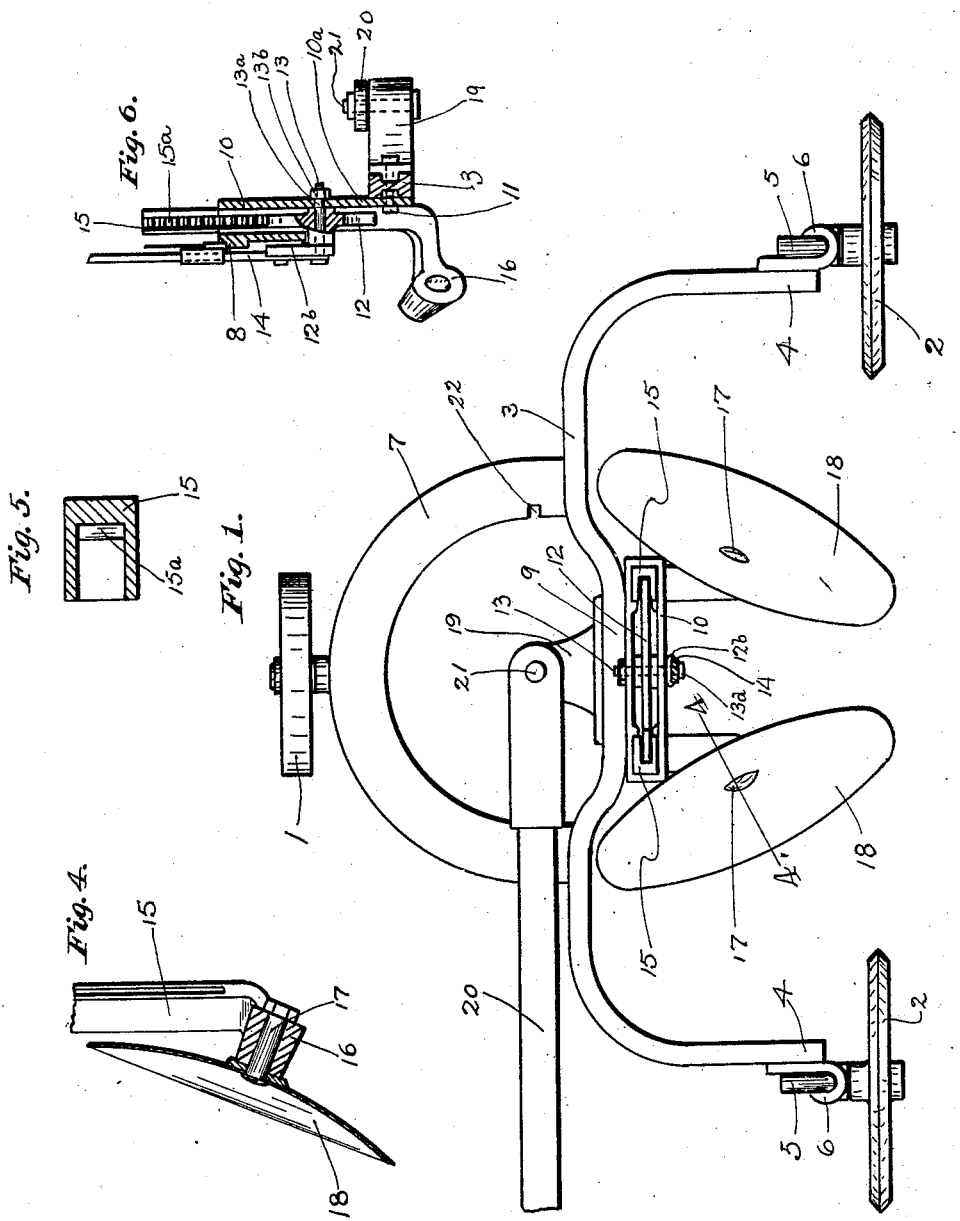
J. BUCHANAN.
PLOW.
APPLICATION FILED DEC. 30, 1908.
933,529.
Patented Sept. 7, 1909.
2 SHEETS—SHEET 1.
Witnesses,
Carrie R. Ivy
Wm Wholey
Inventor,
Judson Buchanan
By Cyrus Kehr
Attorney

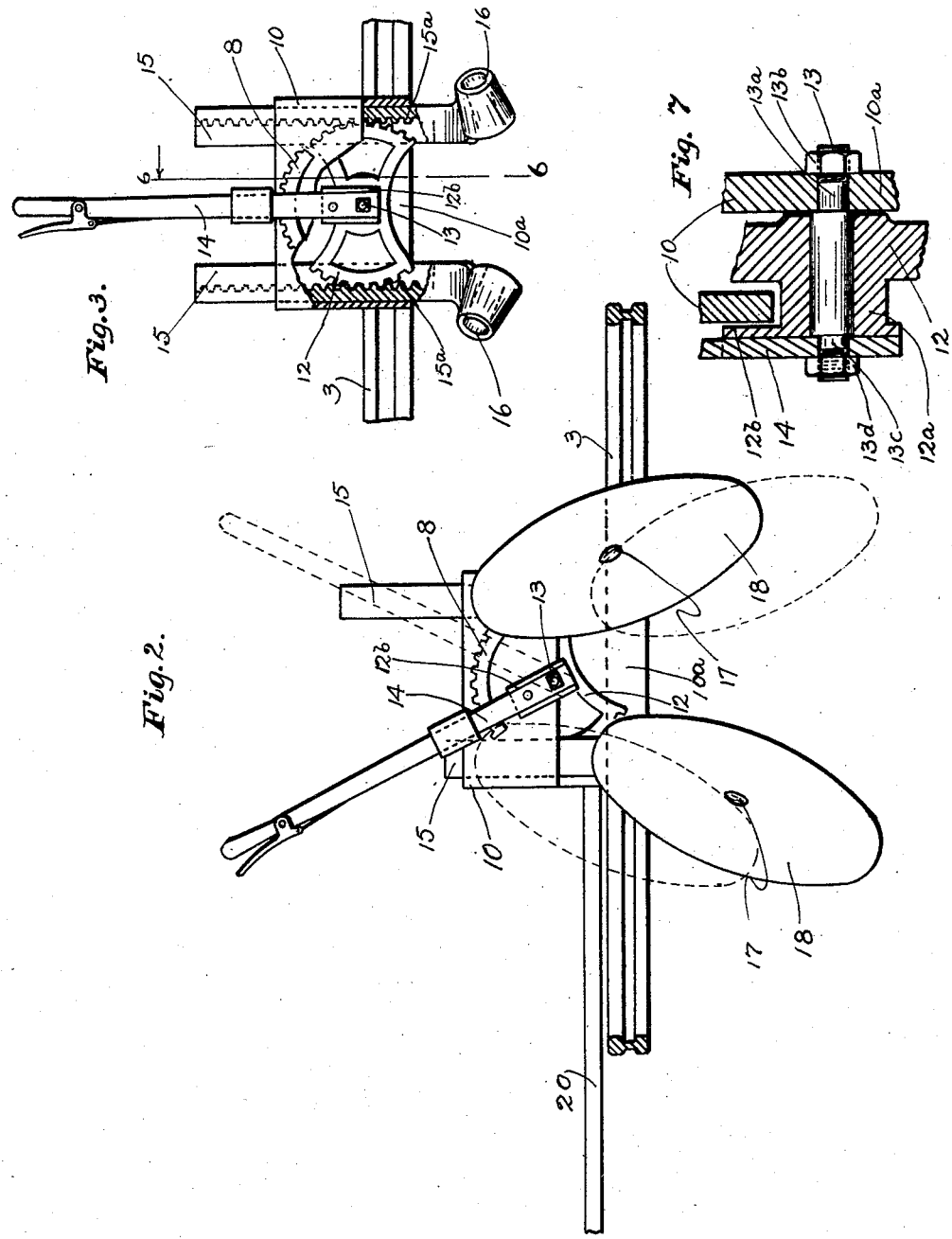

JUDSON BUCHANAN, OF CHATTANOOGA, TENNESSEE.

PLOW.

933,529.  Specification of Letters Patent.  Patented Sept. 7, 1909.

Application filed December 30, 1908. Serial No. 470,045.

*To all whom it may concern:*

Be it known that I, JUDSON BUCHANAN, a citizen of the United States, residing at Chattanooga, in the county of Hamilton and State of Tennessee, have invented a new and useful Improvement in Plows, of which the following is a specification, reference being had to the accompanying drawing.

My improvement relates to plows having revolving mold-boards, and particularly to side-hill or reversible rotary mold-board plows in which two rotary mold-boards are used, one being in action while the plow is moving in one direction and the other being in action while the plow is moving in the opposite direction.

The object of the invention is to produce such a plow embodying efficient means for raising one of the two rotary mold-boards or disks while the other is being lowered. And the present invention is limited to means for such simultaneous movement of said disks and is a modification of the mechanism made the subject-matter of my Patent No. 910,496, dated January 26, 1909.

In the accompanying drawings, Figure 1 is a plan of a plow embodying my improvement; Fig. 2 is a side elevation of a portion of the same plow; Fig. 3 is a sectional elevation of the mold-board or disk-lifting mechanism; Fig. 4 is a sectional detail view on the line 4—4 of Fig. 1, showing one of the disks and a portion of the disk post to which said disk is attached; Fig. 5 is a horizontal transverse section of one of the disk posts; Fig. 6 is an upright section approximately on the line 6—6 of Fig. 3, looking toward the left; Fig. 7 is an upright detail section along the axis of the oscillating gear.

Referring to said drawings, 1 is the land wheel and 2, 2 are the furrow wheels ordinarily used in such plows. Said wheels constitute the carrying wheels for the plow. The frame, in the form shown, comprises a beam, 3, having its ends, 4, turned laterally, and the furrow wheels, 2, are secured to said ends by means of crank-form axles, 5, resting in upright bearings, 6. These wheels and the manner of their attachment may be of any well known form. The middle of the beam, 3, is shown bent laterally toward the same side as are the ends, 4, to form a laterally extended or offset approximately straight portion, 9. The frame further comprises a horizontal semi-circular section, 7, secured to the rear side of the beam (the side toward the land wheel, 1), and the land wheel is secured to said semi-circular piece. From said portion, 9, of the beam rises an upright housing, 10, in which the disk posts are confined and have their up and down movement, said housing forming ways for said posts. Said housing is rectangular and oblong in horizontal cross section and open above and below and has at its lower end an extension, 10ª, which is a continuation of the rear side wall (the wall toward the land wheel, 1), and said extension is applied flatwise against the front side of the beam, and bolts, 11, extend through said extension and said beam and rigidly secure said housing to the beam. Within said housing is located an oscillatory gear, 12, loosely surrounding a bolt, 13, having a neck, 13ª, extending through the rear wall of said housing and bearing a nut, 13ᵇ.

On the front end of its hub, 12ª, the gear, 12, has an upright channeled head, 12ᵇ, in which lies the lower end of a rack lever, 14, the bolt, 13, having a neck, 13ᶜ, extending through said lever and bearing a nut, 13ᵈ, binding said lever to said head. And on the outer face of the adjacent wall of said housing is a toothed rack, 8, adapted for engagement by said lever. At each side of said gear, 12, is an upright disk post, 15, of rectangular cross section and of proper dimensions to fit slidably in said housing, and being channeled at the side of said gear to receive the latter and having teeth, 15ª, in said channel meshing with the teeth at that side of said gear. Thus said two disk posts are supported by said gear and adapted to move simultaneously with said gear, the movement of said gear being oscillatory while the movement of said posts is in upright lines. The lower end of each disk post is turned horizontally forward (as may be seen in Figs. 1 and 6), and each such end supports a bearing, 16, which receives a journal, 17, on a disk, 18, said journals being, respectively, so directed as to place the centers of the disks in a plane parallel to the draft line and the disks are directed oppositely and away from each other, at proper angles, conformably to the opposite drafts. As shown, the disk posts are arranged in a plane parallel to the draft line and the disks are at one side of the posts and so arranged that their centers lie in a vertical plane parallel to the draft line. By moving the track lever in either direction, one of the disk posts and the disks supported thereby will rise while the other disk post and disk supported thereby will descend; and by engaging said rack lever in the rack, 8, at any desired point on the latter, the positions of said disks may be fixed. As will be readily understood from an inspection of the drawings, either disk may be forced to its lower limit (the other at the same time going to its upper limit), or the two disks may be set horizontally opposite each other in position for moving the plow without working.

To the rear face of the laterally-extended portion, 9, of the beam, 3, is applied a horizontal bracket, 19, and at the center of said semi-circular frame section, 7, a tongue, 20, is hinged to said bracket piece by means of an upright journal, 21, whereby said tongue is free to swing through half a circle across said semi-circular piece, 7, for the purpose of reversing the draft. In Fig. 1 said tongue is set for draft toward the left. Said tongue may be secured in its two positions by any suitable means, as, for example, a latch mechanism (not shown) engaging a notch, 22, in said semi-circular piece, 7. Said latch mechanism does not constitute a portion of the present invention, and hence I deem it unnecessary to illustrate and describe the same.

By extending the middle of the beam portion of the frame laterally, and still further extending the frame laterally by means of the housing, 10, room is afforded for mounting the disks in such manner as to clear the frame.

I claim as my invention:

1. In a rotary mold-board plow, the combination with carrying wheels and a frame adapted for two-way draft, upright ways, upright disk posts in said ways, and an oscillatory gear located between and engaging said posts, means for oscillating said gear, and a disk supported by each of said disk posts with the centers of the disks in an upright plane parallel to the draft line and directed oppositely and away from each other conformably to the opposite drafts, substantially as described.

2. In a rotary mold-board plow, the combination with carrying wheels and a frame adapted for two-way draft, an upright housing, upright disk posts in said housing, an oscillatory gear located between and engaging said posts, means for oscillating said gear, and a disk supported by each of said disk posts with the centers of the disks in an upright plane parallel to the draft line and directed oppositely and away from each other conformably to the opposite drafts, substantially as described.

3. In a rotary mold-board plow, the combination with carrying wheels and a frame adapted for two-way draft, upright ways, upright disk posts in said ways, an oscillatory gear located between and engaging said posts, a rack lever for turning said gear, and a disk supported by each of said disk posts with the centers of the disks in an upright plane parallel to the draft line and directed oppositely and away from each other conformably to the opposite drafts, substantially as described.

4. In a rotary mold-board plow, the combination with carrying wheels and a frame adapted for two-way draft, an upright housing, upright disk posts in said housing, an oscillatory gear located between and engaging said posts, a rack lever for turning said gear, and a disk supported by each of said disk posts with the centers of the disks in an upright plane parallel to the draft line and directed oppositely and away from each other conformably to the opposite drafts, substantially as described.

5. In a rotary mold-board plow, the combination with carrying wheels and a frame adapted for two-way draft, said frame comprising a beam and a housing rising from said beam, two disk posts slidable up and down in said housing, an oscillatory gear located between and engaging said posts, means for oscillating said gear, and a disk supported by each of said posts with the centers of the disks in an upright plane parallel to the draft line and directed oppositely and away from each other conformably to the opposite drafts, substantially as described.

6. In a rotary mold-board plow, the combination with carrying wheels and a frame adapted for two-way draft, said frame comprising a beam and a housing rising from one side of said beam, two disk posts slidable up and down in said housing, an oscillatory gear located between and engaging said posts, means for oscillating said gear, and a disk supported by each of said posts with the centers of the disks in an upright plane parallel to the draft line and directed oppositely and away from each other conformably to the opposite drafts, substantially as described.

7. In a rotary mold-board plow, the combination with carrying wheels and a frame adapted for two-way draft, said frame comprising a beam laterally extended at its middle and a housing rising from the laterally extended portion of said beam, two disk posts slidable up and down in said housing, an oscillatory gear located between and engaging said posts, means for oscillating said gear, and a disk supported by each of said posts with the centers of the disks in an upright plane parallel to the draft line and directed oppositely and away from each other conformably to the opposite drafts, substantially as described.

8. In a rotary mold-board plow, the combination with carrying wheels and a frame adapted for two-way draft, said frame comprising a beam laterally extended at its middle and a housing rising from the side of the laterally extended portion of said beam, two disk posts slidable up and down in said housing, an oscillatory gear located between and engaging said posts, means for oscillating said gear, and a disk supported by each of said posts with the centers of the disks in an upright plane parallel to the draft line and directed oppositely and away from each other conformably to the opposite drafts, substantially as described.

In testimony whereof I have signed my name, in presence of two witnesses, this nineteenth day of December, in the year one thousand nine hundred and eight.

JUDSON BUCHANAN.

Witnesses:
J. P. MINTURN,
GEO. FREEMAN.